(12) United States Patent
Golberg et al.

(10) Patent No.: US 11,448,601 B2
(45) Date of Patent: Sep. 20, 2022

(54) METHOD AND SYSTEM FOR OBTAINING INFORMATION FROM A SAMPLE

(71) Applicant: Applied Materials Israel Ltd., Rehovot (IL)

(72) Inventors: Boris Golberg, Ashdod (IL); Roman Naidis, Rehovot (IL)

(73) Assignee: Applied Materials Israel Ltd., Rehovot (IL)

(*) Notice: Subject to any disclaimer, the term of this patent is extended or adjusted under 35 U.S.C. 154(b) by 300 days.

(21) Appl. No.: 16/885,785

(22) Filed: May 28, 2020

(65) Prior Publication Data

US 2021/0372936 A1 Dec. 2, 2021

(51) Int. Cl.
*G01N 21/88* (2006.01)
*G02B 21/08* (2006.01)
*G02B 5/20* (2006.01)
*G01N 21/95* (2006.01)

(52) U.S. Cl.
CPC ..... *G01N 21/8806* (2013.01); *G01N 21/9501* (2013.01); *G02B 5/20* (2013.01); *G02B 21/082* (2013.01)

(58) Field of Classification Search
CPC .. G01N 21/8806; G01N 21/9501; G02B 5/20; G02B 21/082; G02B 21/0032
See application file for complete search history.

(56) References Cited

U.S. PATENT DOCUMENTS

2006/0007436 A1* 1/2006 Kurosawa .......... G01N 21/9501
356/237.4

* cited by examiner

*Primary Examiner* — Donald L Raleigh
(74) *Attorney, Agent, or Firm* — Kilpatrick Townsend & Stockton LLP

(57) ABSTRACT

A method and a system for obtaining information from a sample. The system may include (i) a spatial filter that includes a blocking element and an aperture; (ii) an illumination unit; and (iii) an optical unit that includes an optical objective assembly. The illumination unit may be configured to illuminate the optical objective assembly with oblique radiation. The optical objective assembly may be configured to (a) focus the oblique radiation onto the sample, (b) collect radiation from the sample to provide collected radiation, and (c) reflect the oblique radiation to provide back reflected radiation. The optical unit may be configured to (a) focus the collected radiation to provide focused collected radiation, (b) direct the focused collection radiation towards the aperture, (c) focus the back reflected radiation to provide focused back reflected radiation, and (d) direct the focused back reflected radiation towards the blocking element.

16 Claims, 4 Drawing Sheets

METHOD AND SYSTEM FOR OBTAINING INFORMATION FROM A SAMPLE

BACKGROUND

A semiconductor wafer (hereinafter—wafer) includes multiple layers that are manufactured by a highly complex manufacturing process.

A wafer is usually inspected one area after the other. An area of the wafer is inspected by illuminating the area, collecting radiation generated from the illumination of the area, and analyzing the collected radiation.

The illuminating involves directing a radiation that is normal to an optical objective assembly, towards the optical objective assembly.

The optical objective assembly reflects some of the radiation to provide back reflected radiation. The back reflected radiation is an unwanted signal as it does not provide information regarding the wafer.

The back reflected radiation as well as collected radiation from the sample may be directed towards a sensor that detects a combination of the back reflected radiation and the collected radiation.

The back reflected radiation (which may be regarded as unwanted radiation) and the collected radiation (which may be regarded as wanted radiation) may partially overlap or at least be very proximate to each other, which makes spatial filtering very difficult—especially when considering actual misalignments and inaccuracies in the propagation path of the back reflected radiation, and in the propagation path of the collected radiation.

There is a growing need to provide a method and a system for collecting information from a sample while attenuating and even eliminating the sensing of the back reflected radiation.

SUMMARY

There may be provided a method, a non-transitory computer readable medium and a system for collecting information from a sample.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION

Figure 1:
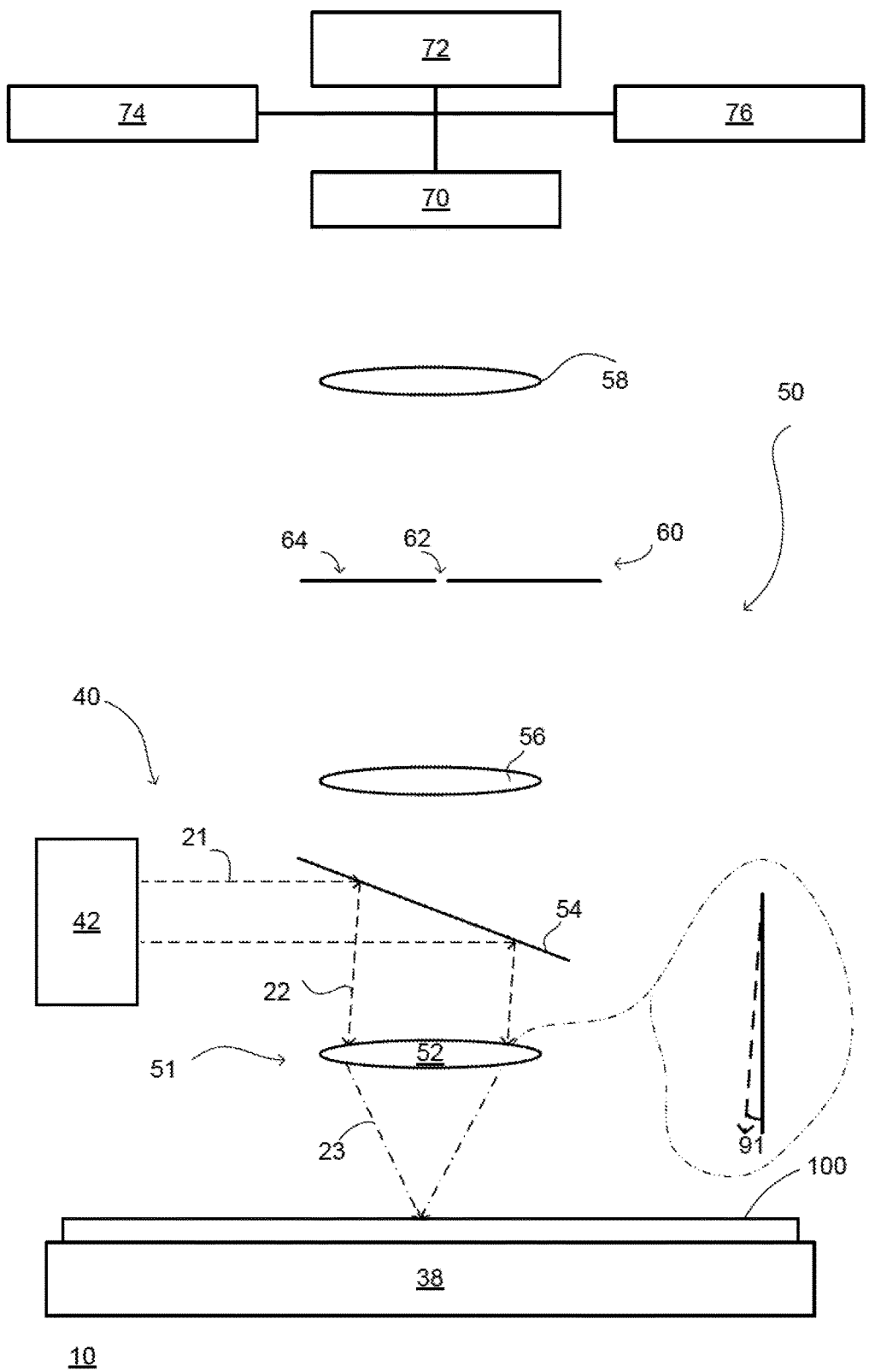
FIG. 1 illustrates an example of a system.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method.

Any reference in the specification to a system should be applied mutatis mutandis to a method that may be executed by the system.

The term "and/or" means additionally or alternatively.

There may be provided a system and a method for obtaining information from a sample. The system and the method may utilize radiation that may be within the visible light range, within the ultraviolet range (for example within a wavelength range of 10-400 nanometers), within the deep ultraviolet range and/or within the extreme ultraviolet range (for example within a wavelength range of 10-124 nanometers).

The sample may be a wafer, a solar panel, a lithographic mask, a Microelectromechanical (MEMS) device, and the like.

For simplicity of explanation it is assumed that the sample is a wafer.

It is assumed that the sample is horizontal, but the sample and any of the components of the system may be oriented in any manner.

Figure 2:
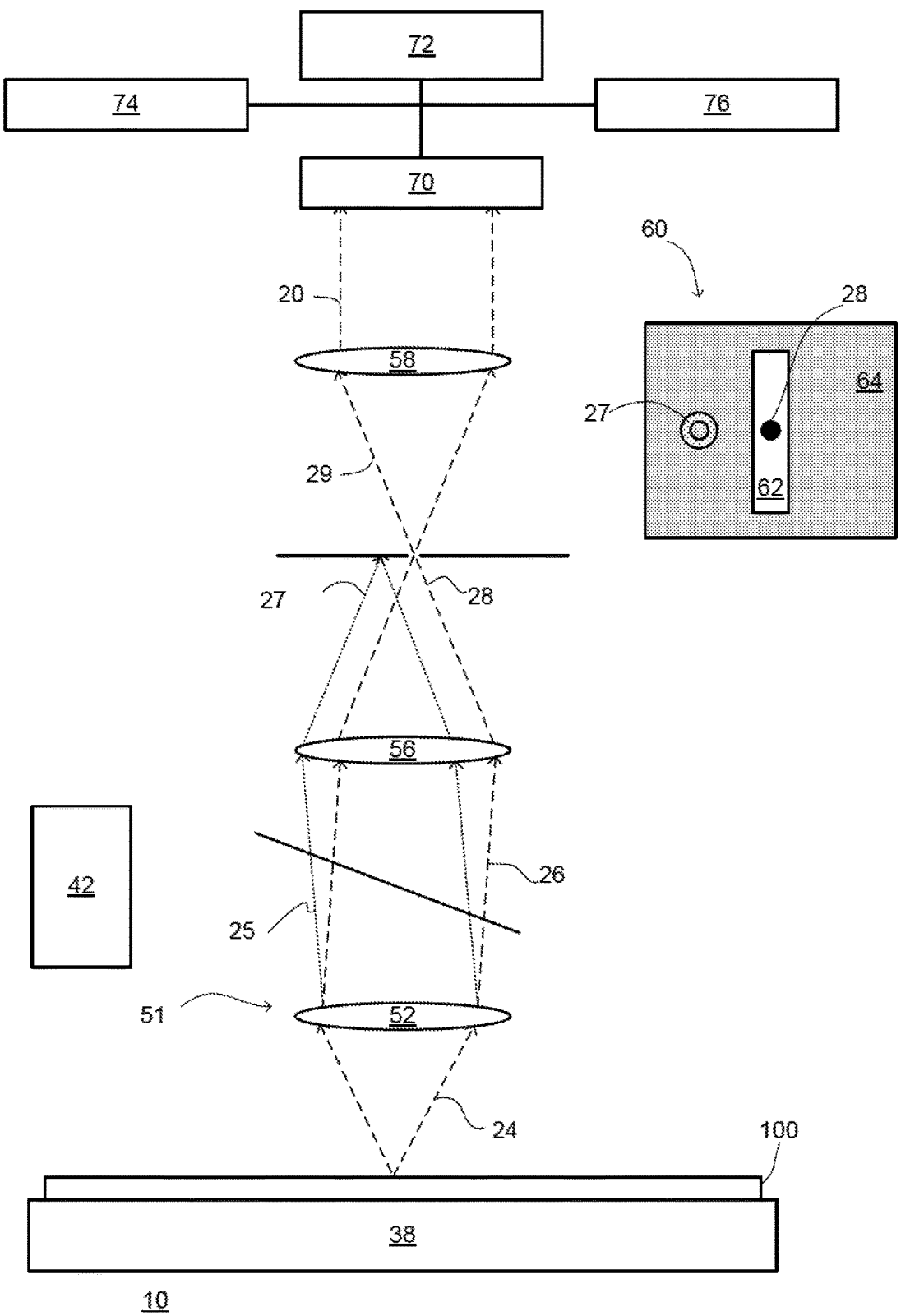
FIG. 2 illustrates an example of a system.

FIGS. 1 and 2 illustrate examples of system 10 for obtaining information from a sample such as wafer 100.

For simplicity of explanation, the propagation of radiation towards the sample is illustrated in FIG. 1 and the propagation of radiation from the sample and from the optical objective assembly is illustrated in FIG. 2. Both figures refer to the same system.

System 10 may be an inspection system, a metrology system, and the like.

System 10 includes spatial filter 60, illumination unit 40, optical unit 50, optical objective assembly 51, sensor 70, image processor 72, controller 74, memory unit 76, and support and movement unit 38 for supporting and moving wafer 100.

Some of the optical components, such as the optical objective assembly 51, may be used for both illumination and inspection.

The optical objective assembly 51 may include one or more lenses. In FIGS. 1-2 the optical objective assembly 51 includes first objective lens 52.

FIG. 2 illustrates the spatial filter 60 as including blocking element 64 and an aperture 62 that is formed in the blocking element.

The aperture 62 of FIG. 2 is elongated along an axis that may extend inside and outside FIG. 2 to allow scanning along this axis. The aperture 62 may have a shape that is not elongated or any other shape.

Illumination unit 40 is illustrated as including radiation source and optics 42, and beam splitter 54.

Optical unit 50 is illustrated as including optical objective assembly 51, beam splitter 54, first relay lens 56, spatial filter 60, and second relay lens 58.

Illumination unit 40 is configured to illuminate the optical objective assembly 51 with oblique radiation 22.

In FIG. 1, the radiation source and optics 42 directs input radiation 21 onto beam splitter 54, and the beam splitter 54 passes the input radiation 21 to provide the oblique radiation 22.

The oblique radiation impinges on the optical objective assembly at an oblique angle 91 that differs from ninety degrees by less than one radian—for example less that ten percent of one radian, less than one percent of a radian, and the like.

The oblique angle, and the position of the spatial filter 60 assist in spatially separating, at an intermediate focal plane in which the spatial filter 60 is located, the wanted radiation from the unwanted radiation. The separation is maintained even at the presence of inaccuracies such as misalignments in the propagation paths of the wanted radiation and the unwanted radiation. The separation is maintained as the distance between the aperture and the location of impingement of the unwanted radiation on the blocking element exceeds changes in the location of the impingement due to any of the inaccuracies.

The attenuation of the unwanted radiation may be at least ten time greater in comparison to the attenuation achieved (of the unwanted radiation) when the optical objective assembly is illuminated with normal radiation.

Referring to FIG. 2—the optical objective assembly 51 is configured to (a) focus the oblique radiation onto the sample (see focused illumination beam 23 that may be perpendicular to the sample), (b) collect radiation 24 from the sample (due to the illumination) to provide collected radiation 26), and (c) reflect the oblique radiation to provide back reflected radiation 25.

Optical unit 50 is configured to (a) focus the collected radiation to provide focused collected radiation 28, (b) direct the focused collected radiation towards the aperture 62 (following the aperture 62—the focused collected radiation is defocused—denoted 29), (c) focus the back reflected radiation 25 to provide focused back reflected radiation 27, and (d) direct the focused back reflected radiation 27 towards the blocking element 64.

FIG. 2 illustrates that the spatial filter 60 is configured to prevent the focused back reflected radiation 27 from reaching sensor 70.

The spatial filter 60 is positioned in an intermediate focal plane that is located between the first relay lens 56 and the second relay lens 58.

The first relay lens 56 is configured to focus the collected radiation to provide the focused collected radiation.

Sensor 70 is configured to detect at least a part of the collected radiation—or any representation of the collected radiation—including collimated radiation 20 outputted from second relay lens 58. Detection signals from sensor 70 are sent to image processor 72.

The image processor 72 may be configured to generate an image of the illuminated sample—or an image of at least a scanned area of the sample.

The image processor 72 may include one or more processing circuits such as microprocessors, graphic processing units, hardware accelerators, central processing units, neural network processors, image processors, and the like. The image processor may be programmed (or otherwise constructed and arranged to, or configured to) execute any step of any of the method illustrated in the specification.

Memory unit 76 may be a volatile or non-volatile memory unit, may be configured to store information (such as images), and/or instructions. The memory unit is an example of a non-transitory computer readable medium.

Figure 3:
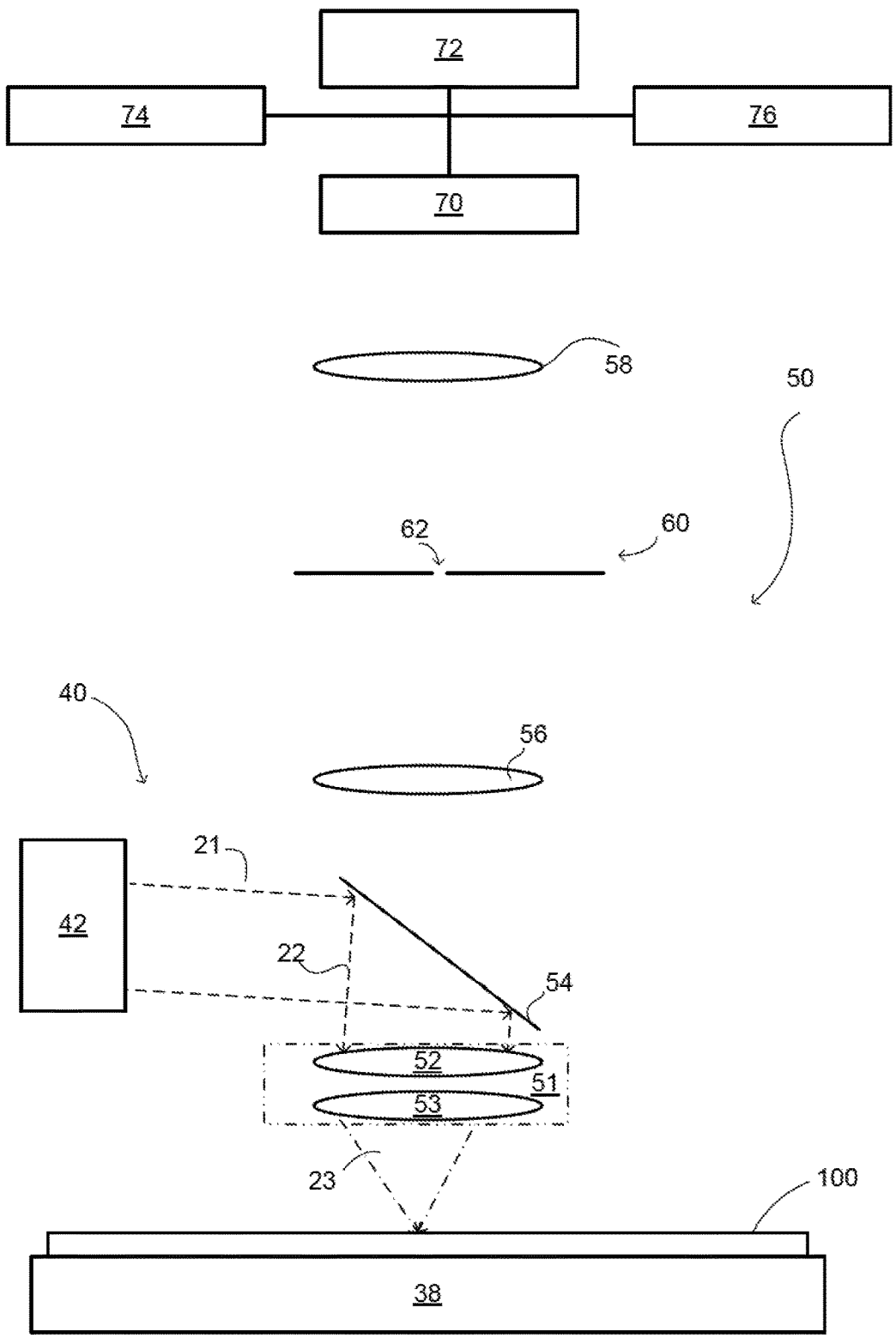
FIG. 3 illustrates an example of a system.

FIG. 3 illustrates an example of system 11 for obtaining information from a sample.

System 11 includes spatial filter 60, illumination unit 40, optical unit 50, and optical objective assembly 51, sensor 70, image processor 72, controller 74, and memory unit 76.

System 11 differs from system 10 by (a) having first objective lens 52 and second objective lens 53 in optical objective assembly 51, and (b) having the input radiation 21 impinge on beam splitter 54 at a different angle than illustrated in FIGS. 1 and 2, and (b) having the beam splitter 54 tilted as a different angle that illustrated in FIGS. 1 and 2.

Figure 4:
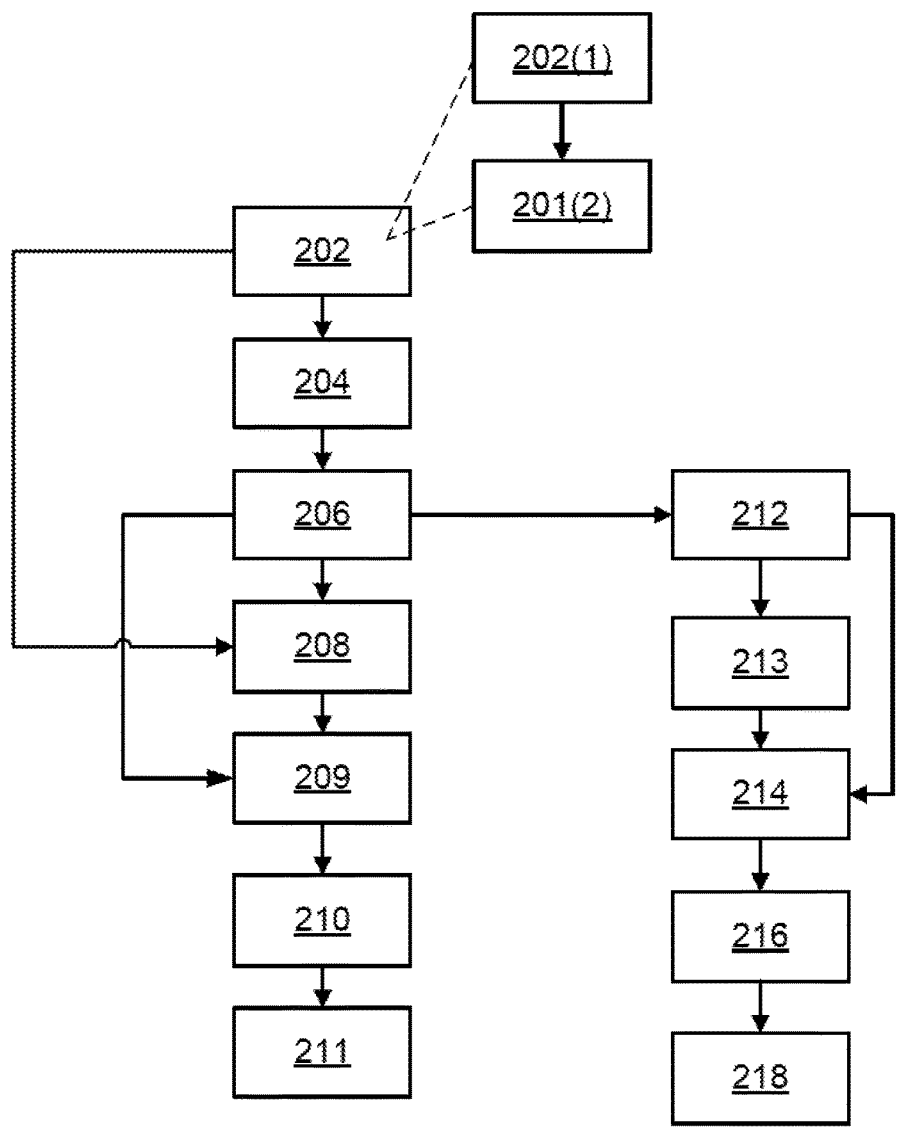
FIG. 4 illustrates an example of a method.

FIG. 4 illustrates an example of method 200.

Method 200 may start by as step 202.

Step 202 may include illuminating, by an illumination unit, an optical objective assembly with oblique radiation.

Step 202 may include step 202(1) of receiving, by a beam splitter, an input radiation, and step 202(2) of passing the input radiation through the beam splitter and towards the optical objective assembly to provide the oblique radiation.

Step 202 may be followed by steps 204 and 208.

Step 204 may include focusing, by an optical objective assembly, the oblique radiation onto the sample.

Step 204 may be followed by step 206.

Step 206 may include collecting, by the optical objective assembly, radiation from the sample to provide collected radiation.

Step 206 may be followed by at least one of steps 208, 209 and 212.

Step 208 may include passing the collected radiation through a beam splitter of the optical unit.

Step 208 may be followed by step 209.

Step 209 may include focusing, by an optical unit, the collected radiation to provide focused collected radiation.

Step 209 may be followed by step 210 of directing, by the optical unit, the focused collection radiation towards an aperture of the spatial filter.

Step 210 may be followed by step 211 of detecting, by the sensor, at least a part of the collected radiation—or any representation of the collected radiation.

Step 212 may include reflecting, by the optical objective assembly, the oblique radiation to provide back reflected radiation.

Step 212 may be followed by steps 213 or 214.

Step 213 may include passing the back reflected radiation through a beam splitter of the optical unit.

Step 213 may be followed by step 214.

Step 214 may include focusing, by the optical unit, the back reflected radiation to provide focused back reflected radiation.

Step 214 may be followed by step 216.

Step 216 may include directing, by the optical unit, the focused back reflected radiation towards a blocking element of the spatial filter.

Step 216 may be followed by step 218.

Step 218 may include preventing, by the spatial filter, the focused back reflected radiation from reaching a sensor of the system, wherein the sensor is positioned downstream to the spatial filter.

The spatial filter may be positioned in an intermediate focal plane that is located between the first relay lens and the second relay lens.

The method may include focusing, by the first relay lens, the collected radiation to provide the focused collected radiation.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The foregoing specification, includes specific examples of one or more embodiments. It will, however, be evident that various modifications and changes may be made therein without departing from the broader spirit and scope of the one or more embodiments as set forth in the appended claims.

We claim:

1. A system for obtaining information from a sample, the system comprises:
    a spatial filter that comprises a blocking element and an aperture;
    an illumination unit;
    an optical unit that comprises an optical objective assembly;
    wherein the illumination unit is configured to illuminate the optical objective assembly with oblique radiation;
    wherein the optical objective assembly is configured to (a) focus the oblique radiation onto the sample, (b) collect radiation from the sample to provide collected radiation, and (c) reflect the oblique radiation to provide back reflected radiation; and
    wherein the optical unit is configured to (a) focus the collected radiation to provide focused collected radiation, (b) direct the focused collection radiation towards the aperture, (c) focus the back reflected radiation to provide focused back reflected radiation, and (d) direct the focused back reflected radiation towards the blocking element.

2. The system according to claim 1 wherein the spatial filter is configured to prevent the focused back reflected radiation from reaching a sensor of the system, wherein the sensor is positioned downstream to the spatial filter.

3. The system according to claim 1 comprising a sensor that is configured to detect at least a part of a representation of the collected radiation.

4. The system according to claim 1 wherein the oblique radiation impinges on the optical objective assembly at an oblique angle that differs from ninety degrees by less than one radian.

5. The system according to claim 1 wherein the oblique radiation impinges on the optical objective assembly at an oblique angle that differs from ninety degrees by less than one percent of a radian.

6. The system according to claim 1 wherein the optical unit comprises a first relay lens, and a second relay lens; wherein the spatial filter is positioned in an intermediate focal plane that is located between the first relay lens and the second relay lens.

7. The system according to claim 1 wherein the optical unit comprises a first relay lens, and a second relay lens; wherein the second relay lens is downstream to the first relay lens, wherein the first relay lens is configured to focus the collected radiation to provide the focused collected radiation.

8. The system according to claim 1 comprising a beam splitter that is configured to (a) receive input radiation, (b) reflect the input radiation towards the optical objective assembly to provide the oblique radiation, (c) receive the collected radiation and the back reflected radiation, and (d) pass the collected radiation and the back reflected radiation through the beam splitter.

9. A method for obtaining information from a sample, the method comprises:
- illuminating, by an illumination unit, an optical objective assembly with oblique radiation;
- focusing, by an optical objective assembly, the oblique radiation onto the sample;
- collecting, by the optical objective assembly, radiation from the sample to provide collected radiation;
- reflecting, by the optical objective assembly, the oblique radiation to provide back reflected radiation;
- focusing, by an optical unit, the collected radiation to provide focused collected radiation,
- directing, by the optical unit, the focused collection radiation towards an aperture of a spatial filter;
- focusing, by the optical unit, the back reflected radiation to provide focused back reflected radiation; and
- directing, by the optical unit, the focused back reflected radiation towards a blocking element of the spatial filter.

10. The method according to claim 9 comprising preventing, by the spatial filter, the focused back reflected radiation from reaching a sensor that is positioned downstream to the spatial filter.

11. The method according to claim 10 comprising detecting, by the sensor, at least a part of a representation of the collected radiation.

12. The method according to claim 9 wherein the oblique radiation impinges on the optical objective assembly at an oblique angle that differs from ninety degrees by less than one radian.

13. The method according to claim 9 wherein the oblique radiation impinges on the optical objective assembly at an oblique angle that differs from ninety degrees by less than one percent of a radian.

14. The method according to claim 9 wherein the optical unit comprises a first relay lens and a second relay lens; wherein the spatial filter is positioned in an intermediate focal plane that is located between the first relay lens and the second relay lens.

15. The method according to claim 9 wherein the optical unit comprises a first relay lens and a second relay lens; wherein the second relay lens is downstream to the first relay lens, wherein the method comprising focusing, by the first relay lens, the collected radiation to provide the focused collected radiation.

16. The method according to claim 9 comprising (a) receiving, by a beam splitter, an input radiation, (b) reflecting, by the beam splitter, the input radiation towards the optical objective assembly to provide the oblique radiation, (c) receiving, by the beam splitter, the collected radiation and the back reflected radiation, and (d) passing the collected radiation and the back reflected radiation, through the beam splitter.

* * * * *